(12) United States Patent
Kaneko et al.

(10) Patent No.: US 6,587,162 B1
(45) Date of Patent: Jul. 1, 2003

(54) LIQUID CRYSTAL DISPLAY

(75) Inventors: Toshiki Kaneko, Chiba (JP); Kikuo Ono, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/457,261

(22) Filed: Dec. 9, 1999

(30) Foreign Application Priority Data

Dec. 11, 1998 (JP) .............................................. 10-353195

(51) Int. Cl.⁷ ................................................ G02F 1/136
(52) U.S. Cl. ............................ 349/43; 349/38; 349/39; 349/42; 349/139; 349/143
(58) Field of Search ................... 349/192, 141, 349/54, 138, 139, 143, 42, 43, 144, 153, 38, 39

(56) References Cited

U.S. PATENT DOCUMENTS

| | | | | |
|---|---|---|---|---|
| 5,278,682 A | * | 1/1994 | Niki ............................ 359/62 |
| 5,796,449 A | * | 8/1998 | Song ............................ 349/54 |
| 5,822,028 A | * | 10/1998 | Miyawaki ................... 349/111 |
| 5,852,485 A | | 12/1998 | Shimada et al. | |
| 6,005,648 A | * | 12/1999 | Zhang et al. ................. 349/43 |
| 6,069,678 A | * | 5/2000 | Sakamoto et al. .......... 349/141 |
| 6,128,061 A | * | 10/2000 | Lee et al. .................... 349/141 |
| 6,233,034 B1 | * | 5/2001 | Lee et al. .................... 349/141 |
| 6,313,889 B1 | * | 11/2001 | Song et al. .................... 349/54 |

FOREIGN PATENT DOCUMENTS

JP          8113166          12/1997

* cited by examiner

*Primary Examiner*—Kenneth Parker
*Assistant Examiner*—David Y. Chung
(74) *Attorney, Agent, or Firm*—Antonelli, Terry, Stout & Kraus, LLP

(57) ABSTRACT

A liquid crystal display device in which electrolytic corrosion is prevented from occurring at the intersections of gate lines and drain lines or in a lead terminal portion over an active matrix substrate. In the liquid crystal display device, each interconnection of a gate line and a drain line over the active matrix substrate is formed to have the gate line, a gate insulating layer, a semiconductor layer, a contact layer, the drain line and a passivation layer all stacked in that order from the active matrix substrate, and a capping layer, which is made of the same ITO layer as a pixel electrode layer, is formed over the passivation layer at the intersection of the gate line and the drain line over the active matrix substrate.

27 Claims, 12 Drawing Sheets

LIQUID CRYSTAL DISPLAY

BACKGROUND OF THE INVENTION

1. Field of the Invention

The present invention relates to a liquid crystal display device and, more particularly, to a liquid crystal display device which is improved in yield factor by preventing disconnection from occurring in a layered line portion or a lead terminal portion in a liquid crystal display device of an active matrix type such as a thin-film transistor (TFT) type.

2. Description of the Related Art

Liquid crystal display devices are widely used as display devices for notebook personal computers, desktop personal computers and other electronic equipment because the liquid crystal display devices have advantages such as thin size, light weight, high contrast, fast response and the capability to reproduce moving images as well as high resolution which compares with cathode ray tubes.

Liquid crystal display devices are basically classified into two types: the type in which a liquid crystal layer is interposed between two substrates at least one of which is made of transparent glass or the like, and predetermined pixels are turned on or off by selectively applying voltage to various kinds of pixel-forming electrodes formed over the substrates (this type is called the simple matrix type); and the type in which such various kinds of electrodes and pixel-selecting switching elements are formed and predetermined pixels are turned on or off by selectively driving these switching elements (this type is called the active matrix type in which so-called thin-film transistors (TFTs) or so-called MIM diodes are used as the switching elements).

The latter active matrix type of liquid crystal display device has become a leading liquid crystal display device because of its contrast performance and its high-speed display performance.

In general, the active matrix type of liquid crystal display device is a vertical electric field type which includes at least a liquid crystal panel and a driving circuit. The liquid crystal panel is made of: an active matrix substrate over which gate lines, a gate insulating layer, a semiconductor layer, a contact layer, source and drain lines, a passivation layer and a pixel electrode layer are formed on one substrate in that order; a color filter substrate over which are formed color filter layers for plural kinds of colors, a black matrix for separating the color filter layers from one another, and a common electrode layer on the other insulative substrate; and a liquid crystal layer sealed in the gap between the active matrix substrate and the color filter substrate. The driving circuit serves to apply display signals for controlling the direction of molecular alignment of the liquid crystal layer to the various kinds of electrodes formed over the active matrix substrate and the color filter substrate. In the vertical electric field type, an electric field for changing the direction of alignment of liquid crystal molecules which constitute the liquid crystal layer is applied between the electrodes formed over the active matrix substrate and the electrodes formed over the other substrate.

In recent years, a lateral electric field type (In-Plane Switching Mode: IPS type) of liquid crystal display device has been put into practice, in which a direction in which to apply an electric field to its liquid crystal is made nearly parallel to the surface of a substrate. In this lateral electric field type of liquid crystal display device, a common electrode to be formed on the other substrate (color filter substrate) in the vertical electric field type of liquid crystal display device is formed on an active matrix substrate as a counter electrode, and a pixel electrode and the counter electrode are arrayed in a comb-tooth-like shape to control the direction of alignment of liquid crystal molecules in a plane parallel to the substrate.

In this type of liquid crystal display device, since the intersections of gate lines and drain lines are formed between adjacent pixels over the active matrix substrate, it is important that the breakdown voltage of the passivation layer (CVD insulating layer) between the gate lines and the drain lines be sufficiently high.

FIG. 14 is a plan view illustrating the essential portion of one example of the construction of an intersection of a gate line and a drain line in a pixel area of a related-art liquid crystal display device which uses thin-film transistors as switching elements, and FIG. 15 is a cross-sectional view taken along line A–A' of FIG. 14.

As shown in FIG. 15 taken along line A–A' of FIG. 14, in the intersection of a gate line and a drain line, a gate line 2, a gate insulating layer 3, a semiconductor layer 4, a contact layer 5, a drain layer 6, a source electrode 7 and a passivation layer 8 are formed over a lower transparent insulative substrate 1 which is an active matrix substrate.

In FIG. 14, reference numeral 9 denotes a contact hole for connecting a pixel electrode 10 and the source electrode 7, and reference numeral 11 denotes a light shield layer.

In addition, the surfaces of terminal lead lines, which are formed outside the pixel area of a liquid crystal panel in which a liquid crystal is sealed, are covered with an insulating material such as a resin so that the terminal lead lines are isolated from external impact or moisture contained in the air.

FIG. 16 is a diagrammatic cross-sectional view illustrating an example of the construction of an outside portion of the pixel area of the liquid crystal panel, and FIG. 17 is an enlarged cross-sectional view of the essential portion of FIG. 16. In FIGS. 16 and 17, reference numeral 1 denotes an active matrix substrate, reference numeral 14 an upper transparent insulative substrate which is a color filter substrate, reference numeral 15 denotes a liquid crystal layer, reference numeral 16 a sealing material, reference numeral 17 a driver chip, reference numeral 18 an epoxy resin, reference numeral 19 a conductor layer, and reference numeral 20 a bump.

As shown in FIGS. 16 and 17, the liquid crystal layer 15 is interposed between the active matrix substrate 1 and the color filter substrate 14, and is sealed along its periphery by the sealing material 16. The driver chip 17 is disposed in the periphery of the active matrix substrate 1, and is connected to a terminal line which is led from the pixel area inside the sealing material 16.

The liquid crystal panel is covered with the epoxy resin 18 on its sealing-material side and on the side on which the driver chip 17 is disposed, whereby the pixel area and the driver chip are isolated from external impact and moisture contained in the air.

As shown in FIG. 15, in case that a minute defect is present in the gate insulating layer 3 at the intersection of the gate line 2 and the drain line 6 in an individual pixel of the pixel area, the gate line 2 and the drain line 6 will be electrically shorted or a leak current will flow therebetween when a voltage is applied to both lines as indicated by an arrow C, because the breakdown voltage of the gate insulating layer 3 is low. This defect frequently occurs in an edge portion in which the drain line 6 passes over the gate line 2.

At this time, in case that a defect is present in the passivation layer 8 as indicated by an arrow A, there will occur the problem that moisture contained in the air penetrates through the portion of the detect of the passivation layer 8 and the drain line 6 breaks down by an electrolytic corrosion action as indicated by an arrow B.

Another problem is that, in the peripheral portion of the liquid crystal panel, as shown by the left-hand one of arrows A in FIG. 17, a crack is formed in the passivation layer 8 at the edge portion of the epoxy resin 18 by the stress thereof and moisture contained in the air penetrates through the crack and an electrolytic corrosion occurs in the drain line 6, thus leading to the disconnection of the drain line 6. A similar problem occurs on a lead-terminal side of the gate line 2.

As shown in FIG. 17, the bump 20 of the driver chip 17 is connected to a terminal line (the drain line 6) which is led to the periphery of the active matrix substrate 1, via a conductor layer 19 which extends through a through-hole formed in the passivation layer 8.

This driver chip mounting portion as well as the driver chip 17 is coated with the insulating layer 18 of an epoxy resin. This also results in the problem that, as shown-by the right-hand one of the arrows A in FIG. 17, a crack is formed in the passivation layer 8 at the edge portion of the epoxy resin 18 by the stress thereof and moisture contained in the air penetrates through the crack and an electrolytic corrosion occurs in the drain line 6, thus leading to the disconnection of the drain line 6.

SUMMARY OF THE INVENTION

The invention aims to provide a highly reliable liquid crystal display device by solving the problems of the related art and preventing electrolytic corrosions from occurring at the intersections of gate lines and drain lines or in a lead terminal portion over an active matrix substrate.

Therefore, the invention prevents moisture from penetrating toward an electrode or a lead terminal portion through a passivation layer by coating the passivation layer with ITO. In order to solve the above-mentioned problems, the present invention takes chiefly the following means.

(1) A liquid crystal display comprising a pair of substrates, a liquid crystal layer interposed between said pair of substrates, a gate line formed on one of said pair of substrate, a first insulating layer covering said gate line, a drain line formed on said first insulating layer, a second insulating layer covering said drain line, a pair of electrodes disposed between said pair of electrodes, wherein a portion of said drain line is intersected with said gate line, and an electrically conductive layer is formed on said second insulating layer and at least said portion.

(2) A liquid crystal display comprising, a pair of substrates, a liquid crystal layer interposed between said pair of substrates, a gate line formed on one of said pair of substrate, a first insulating layer formed over said gate line, a drain line formed on said first insulating layer, a second insulating layer formed over said drain line, a pair of electrodes disposed between said liquid crystal layer and one of said pair of substrates, wherein a black matrix formed on another of said pair of substrates and shielding said gate line and said drain line, and a portion of said drain line is intersected with said gate line, and an electrically conductive layer is formed on said second insulating layer and covering at least said portion.

(3) A liquid crystal display comprising, a pair of substrates, a liquid crystal layer interposed between said pair of substrates, a gate line formed on one of said pair of substrate, a common line formed on one of said pair of substrate, a first insulating layer formed on said common line, a drain line formed on said first insulating layer, a second insulating layer formed on said drain line, a pixel electrode formed on said first insulating layer, a counter electrode formed on one of said pair of substrate, wherein a portion of said drain line is intersected with said common line, and a black matrix formed on another of said pair of substrates and shielding said common line and said drain line, and an electrically conductive layer is formed on said second insulating layer and covered at least said portion.

1. (4) A liquid crystal display comprising, a pair of substrates, a liquid crystal layer interposed between said pair of substrates, a plurality of gate line formed on one of said substrates, extend to form a gate pad, a plurality of drain line formed on one of said substrates, extend to form a drain pad, an insulating layer covering said gate line and said drain line, a plurality of pixel electrodes formed on said insulating layer, wherein an electrically conductive layer formed on said gate line adjacent to said gate pad, and a resin covering at least a portion of an edge of said electrically conductive layer.

(5) A liquid crystal display comprising, a pair of substrates, a liquid crystal layer interposed between said pair of substrates, a plurality of gate line formed on one of said substrates and extended to form a gate pad, a plurality of drain line formed on one of said substrates and extend to form a drain pad, a pair of electrodes formed on one of said substrates, an insulating layer covering said gate line, said drain line and at least one of said pair of electrodes, wherein an electrically conductive layer formed on said drain line adjacent to said drain pad, and a resin covering at least a portion of an edge of said electrically conductive layer.

Moreover, the liquid crystal display device according to the invention has any of constructions which will be described below in Paragraphs (6) to (10).

(6) A liquid crystal display device includes at least a liquid crystal panel and a driving circuit. The liquid crystal panel is made of: one insulative substrate over which an interconnection of a gate line and a drain line is formed to have a structure in which the gate line, a gate insulating layer, a semiconductor layer, a contact layer, the drain line and a passivation layer are stacked in that order from the insulative-substrate side; another insulative substrate over which are formed color filter layers for plural kinds of colors, a black matrix for separating the color filter layers from one another, and a common electrode layer; and a liquid crystal layer sealed in the gap between both substrates, The driving circuit serves to apply display signals for controlling the direction of molecular alignment of the liquid crystal layer to the various kinds of electrodes formed in the liquid crystal panel. The liquid crystal display device further includes a capping layer which is made of the same ITO layer as the pixel electrode layer and is formed over the passivation layer at the intersection of the gate line and the drain line which are formed over the one substrate.

According to this construction, in the process of manufacturing the one substrate over which the gate line and the drain line are formed, moisture contained in the air is prevented from penetrating toward the gate line and the drain line through the passivation layer, and electrolytic corrosion of the drain line in particular is prevented, whereby it is possible to provide a highly reliable liquid crystal display device.

(7) A liquid crystal display device includes at least a liquid crystal panel and a driving circuit. The liquid crystal panel is made of: one insulative substrate over which an interconnection of a gate line and a drain line is formed to have a structure in which the gate line, a gate insulating layer, a semiconductor layer, a contact layer, the drain line and a passivation layer are stacked in that order from the insulative-substrate side; another insulative substrate over which are formed color filter layers for plural kinds of colors, a black matrix for separating the color filter layers from one another, and a common electrode layer; and a liquid crystal layer sealed in the gap between both substrates. The driving circuit serves to apply display signals for controlling the direction of molecular alignment of the liquid crystal layer to the various kinds of electrodes formed in the liquid crystal panel. The liquid crystal display device further includes a capping layer which is made of an ITO layer and is formed over the passivation layer formed over a lead terminal line at the periphery of a pixel area of the one substrate.

According to this construction, neither electrolytic corrosion nor cracks occur in the lead terminal line which is led to the periphery of the pixel area after the manufacture of the liquid crystal panel, whereby it is possible to provide a highly reliable liquid crystal display device.

(8) A liquid crystal display device includes at least a liquid crystal panel and a driving circuit. The liquid crystal panel is made of: one insulative substrate over which an interconnection of a gate line and a drain line is formed to have a structure in which the gate line, a gate insulating layer, a semiconductor layer, a contact layer, the drain line and a passivation layer are stacked in that order from the insulative-substrate side; another insulative substrate over which are formed color filter layers for plural kinds of colors, a black matrix for separating the color filter layers from one another, and a common electrode layer; and a liquid crystal layer sealed in the gap between both substrates. The driving circuit serves to apply display signals for controlling the direction of molecular alignment of the liquid crystal layer to the various kinds of electrodes formed in the liquid crystal panel. The liquid crystal display device further includes a capping layer which is made of the same ITO layer as the pixel electrode layer and is formed over the source electrode and under the passivation layer at the intersection of the gate line and the drain line which are formed over the one substrate.

According to this construction, in the process of manufacturing the one substrate over which the gate line and the drain line are formed, moisture contained in the air is prevented from penetrating toward the gate line and the drain line, and electrolytic corrosion of the drain line in particular is prevented, whereby it is possible to provide a highly reliable liquid crystal display device.

(9) A liquid crystal display device includes at least a liquid crystal panel and a driving circuit. The liquid crystal panel is made of: one insulative substrate over which an interconnection of a gate line and a drain line is formed to have a structure in which the gate line, a gate insulating layer, a semiconductor layer, a contact layer, the drain line and a passivation layer are stacked in that order from the insulative-substrate side, another insulative substrate over which are formed color filter layers for plural kinds of colors, a black matrix for separating the color filter layers from one another, and a common electrode layer; and a liquid crystal layer sealed in the gap between both substrates. The driving circuit serves to apply display signals for controlling the direction of molecular alignment of the liquid crystal layer to the various kinds of electrodes formed in the liquid crystal panel. The liquid crystal display device further includes a capping layer which is made of an ITO layer and is formed between lead terminal lines and under the passivation layer formed over the lead terminal lines at the periphery of a pixel area of the liquid crystal panel.

According to this construction, neither electrolytic corrosion nor cracks occur in the lead terminal lines which are led to the periphery of the pixel area after the manufacture of the liquid crystal panel, whereby it is possible to provide a highly reliable liquid crystal display device.

(10) In each of the constructions (6) (7) (8) and (9), the capping layer is formed to have a width equal to or greater than the line width of the underlying conductor layer.

According to this construction, moisture contained in the air is prevented from penetrating toward the gate line and the drain line during the process of manufacturing the one substrate, as well as moisture contained in the air is prevented from penetrating toward a lead terminal portion after the sealing of the liquid crystal panel with a sealing material, whereby it is possible to prevent the occurrence of disconnection due to electrolytic corrosion as well as the occurrence of disconnection in a lead terminal due to stresses caused by the curing of the resin applied to the periphery of the liquid crystal panel and a driver chip mounting portion. Accordingly, it is possible to provide a highly reliable liquid crystal display device.

According to each of the constructions of the invention, it is possible to efficiently prevent disconnection or the like due to electrolytic corrosion or stress caused by the penetration of moisture toward the gate line, the drain line, the intersection of both lines in the pixel area or the conductor layer of a lead terminal.

If foreign matter is present near the gate line, the drain line and the intersection of both lines and a current leak occurs in the gate insulating layer, there are cases in which the passivation layer abnormally grows owing to the foreign matter and a pinhole is formed in the abnormal portion of the passivation layer. There is a strong possibility that pinholes are formed in a gate line portion where the coverage of a CVD layer is inferior. Moreover, at the intersection of the gate line and the drain line, there is a possibility that the drain line is formed above a pinhole and a pinhole is also formed in the overlying passivation layer.

If a pinhole is formed, moisture contained in the air easily penetrates into a portion below the passivation layer through the pinhole, and static electricity occurs in this portion during the manufacture of an active matrix substrate or an electrochemical corrosion reaction (electrolytic corrosion) occurs when electricity flows through the lines during a continuity test after the manufacture, so that the lines are broken down. To prevent this breakdown, it is only necessary to block the supply of moisture which is a main cause of electrolytic corrosion.

In the invention, at the same time that pixel electrodes are formed, a capping layer (protective layer: also called a cap layer) made of a transparent conductive layer is formed over the portion of a passivation layer in which electrolytic corrosion easily occurs. If a pinhole is formed in a portion of the passivation layer, the pinhole is buried by a pattern of the transparent conductive layer formed in that portion, whereby the supply of moisture is intercepted. To completely cap (cover) a portion where a pinhole occurs, it is only necessary to make the width of the capping layer larger than that of the drain line.

In addition, by disposing the capping layer in the pinhole portion, it is possible to prevent diffusion of impurities into an alignment layer and the liquid crystal layer from the active matrix substrate underlying the passivation layer. If alkali metal ions which are contaminant elements or metal ions from metal layers which form the lines penetrate the liquid crystal layer through a pinhole, the electric conductivity of the liquid crystal layer decreases to cause a defective display. Since the source of the metal ions is very uneven, contaminant elements are easily stored in the source, and further, there is a strong possibility that the electrolytic corrosion occurs at the intersection of a gate line and a drain line which are easily supplied with metal ions by the electrolytic corrosion. Accordingly, it is possible to restrain the occurrence of a defective display by capping such an intersection portion with an electrically stable oxide transparent conductive layer (such as indium tin oxide: ITO).

If the capping layer is to be formed from the same layer as the pixel electrodes, it is preferable to form the capping layer at the intersections of gate lines and drain lines in portions where pixel electrodes are absent, because if the capping layer contacts a pixel electrode, the pixel capacitance thereof varies to cause a spot defect.

It is to be noted that the capping layer which is formed in the pixel area need not necessarily be the same layer as the pixel electrode, and can also be formed independently of the ITO layer from which the pixel electrode is formed.

In a case where a lateral electric field is to be applied as means for controlling the molecular alignment of a liquid crystal, each pixel electrode is formed of a common electrode and a source electrode each having a comb-teeth-like shape. In this case, since no pixel electrode is formed over the passivation layer, a capping layer can be widely formed over the passivation layer without forming a short-circuit between adjacent pixels. Accordingly, in the case of the lateral electric field type, a capping layer made of a transparent conductive layer can be widely formed over each of drain and gate lines. Since this capping layer can be formed at the same time as a terminal conductive coating layer, the number of manufacturing steps need not be increased.

BRIEF DESCRIPTION OF THE DRAWINGS

The invention will become more readily appreciated and understood from the following detailed description of preferred embodiments of the invention when taken in conjunction with the accompanying drawings, in which.

DESCRIPTION OF THE PREFERRED EMBODIMENTS

Preferred embodiments of the invention will be described below in detail.

Figure 1:
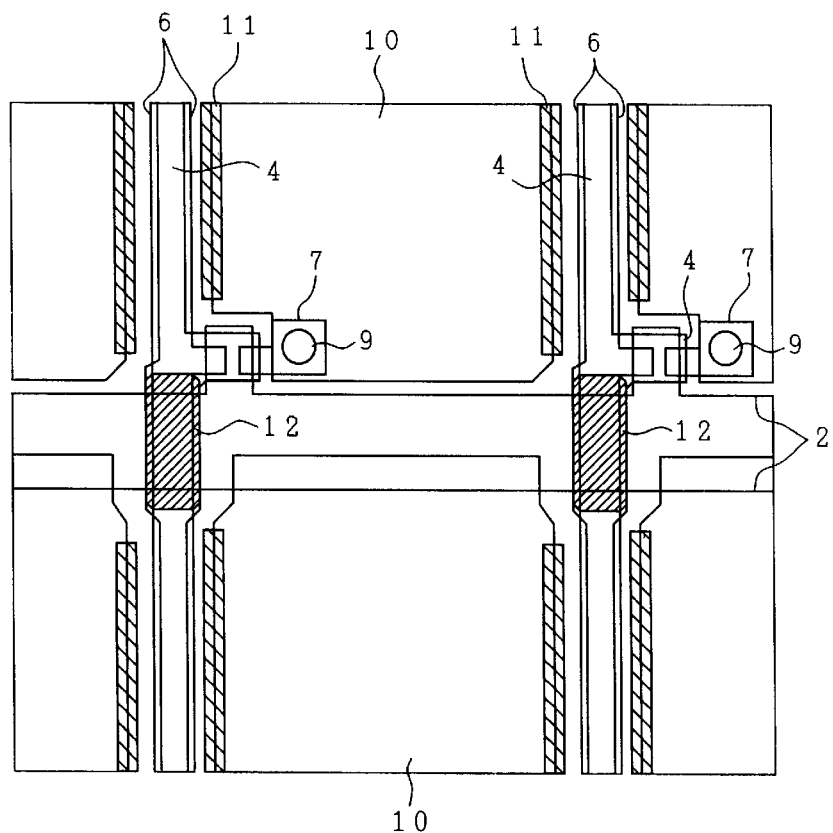
FIG. 1 is a plan view illustrating one embodiment of a liquid crystal display device according to the invention which uses thin-film transistors as switching elements, and showing the essential portion of one example of the construction of an intersection of a gate line and a drain line in a pixel area.
Figure 2:
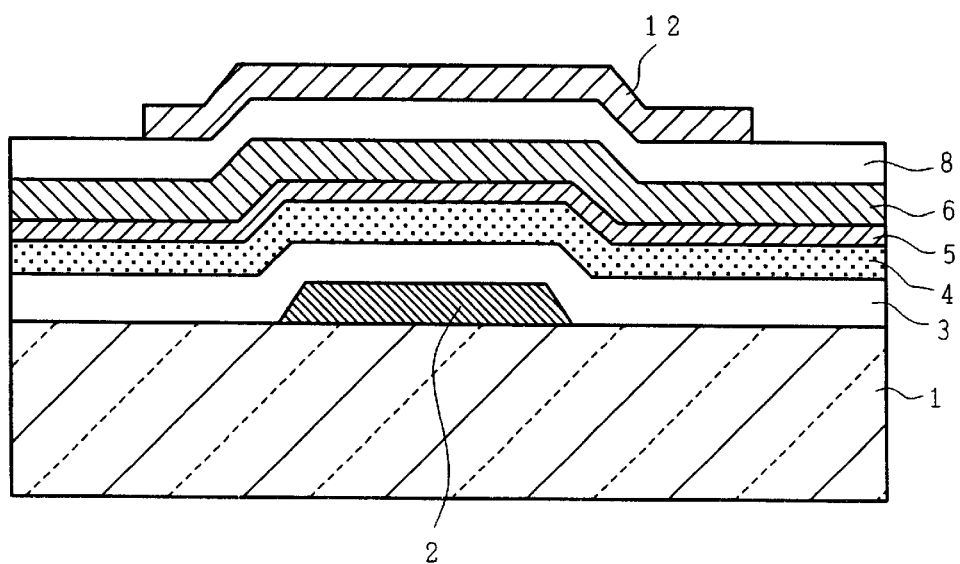
FIG. 2 is a cross-sectional view taken along line A–A' of FIG. 1.

FIG. 1 is a plan view illustrating one embodiment of the liquid crystal display device according to the invention which uses thin-film transistors as switching elements, and shows the essential portion of one example of the construction of an intersection of a gate line and a drain line in a pixel area, and FIG. 2 is a cross-sectional view taken along line A–A' of FIG. 1.

As shown in FIG. 2 taken along line A–A' of FIG. 1, in the intersection of a gate line and a drain line, a gate line 2, a gate insulating layer 3, a semiconductor layer 4, a contact layer 5, a drain layer 6, a source electrode 7 and a passivation layer 8 are formed over a lower transparent insulative substrate 1 which is an active matrix substrate.

In FIG. 1, reference numeral 9 denotes a contact hole for connecting a pixel electrode 10 and the source electrode 7, and reference numeral 11 denotes a light shield layer. The layer construction mentioned above is similar to that shown in FIG. 14.

In this embodiment, a capping layer 12 made of ITO is formed at the intersection of the gate line 2 and the drain layer 6 so that penetration of moisture contained in the air is prevented even if a pinhole is formed in the passivation layer 8.

It is to be noted that it is possible to increase a capping effect to a further extent by making the width (whether vertical or lateral) of the capping layer 12 equal to or greater than the width of each of the gate line 2 and the drain layer 6.

Figure 3:
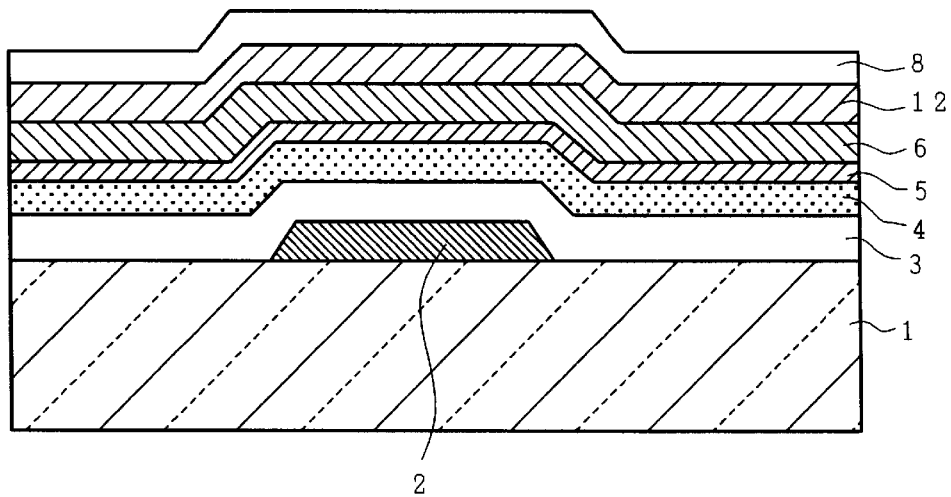
FIG. 3 is a cross-sectional view corresponding to FIG. 2, illustrating another embodiment of the liquid crystal display device according to the invention and showing the essential portion of another example of the construction of an intersection of a gate line and a drain line in a pixel area.

FIG. 3 is a cross-sectional view corresponding to FIG. 2, illustrating another embodiment of the liquid crystal display device according to the invention, and shows the essential portion of another example of the construction of an intersection of a gate line and a drain line in a pixel area.

In this embodiment, the layer construction at the intersection of a gate line and a drain line over an active matrix substrate is such that the gate line 2, the gate insulating layer 3, the semiconductor layer 4, the contact layer 5, the drain line 6, the capping layer 12 made of ITO, and the passivation layer 8 are formed in that order over the transparent insulative substrate 1.

In this construction, since the capping layer 12 is inserted below the passivation layer 8, even if a pinhole occurs in the passivation layer 8 and moisture penetrates through the pinhole; the moisture does not reach the drain line 6, and therefore electrolytic corrosion does not occur in the drain, line 6.

It is also to be noted that it is possible to increase a capping effect to a further extent by making the width (whether vertical or lateral) of the capping layer 12 equal to or greater than the width of the drain layer 6.

The surfaces of terminal lead lines, which are formed outside the pixel area of a liquid crystal panel in which a liquid crystal is sealed, are covered with an insulating material such as a resin so that the terminal lead lines are isolated from external impact or moisture contained in the air.

Figure 4:
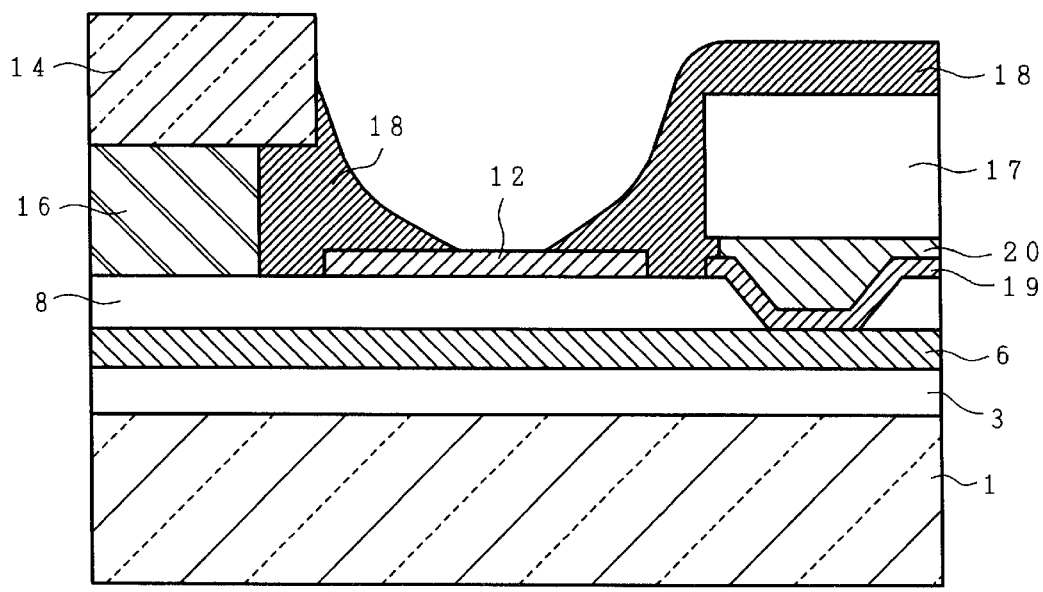
FIG. 4 is a partial enlarged cross-sectional view illustrating the essential portion of an example of the construction of an outside portion of the pixel area of the liquid crystal panel.
Figure 17:
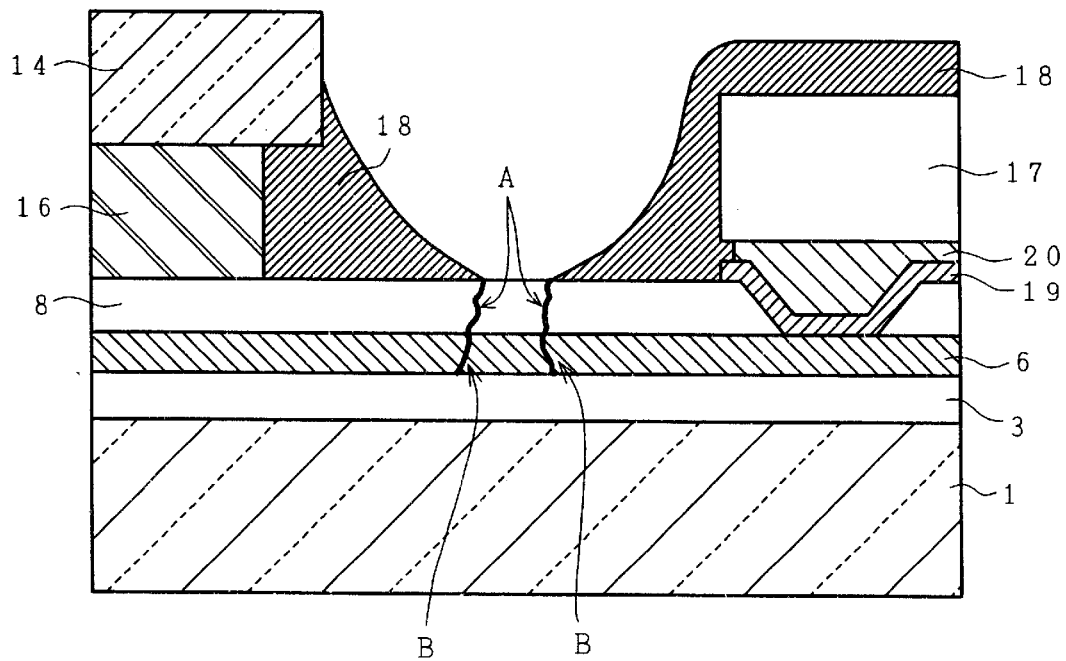
FIG. 17 is an enlarged cross-sectional view of the essential portion of the example shown in FIG. 16.

FIG. 4 is a partial enlarged cross-sectional view corresponding to FIG. 17, illustrating an example of the construction of an outside portion of the pixel area of the liquid crystal panel. In FIG. 4, reference numeral 1 denotes a lower substrate which is an active matrix substrate, reference numeral 14 an upper transparent insulative substrate which is a color filter substrate, reference numeral 16 a sealing material, reference numeral 17 a driver chip, reference numeral 18 an epoxy resin, reference numeral 19 a conductor layer, and reference numeral 20 a bump.

Figure 5:
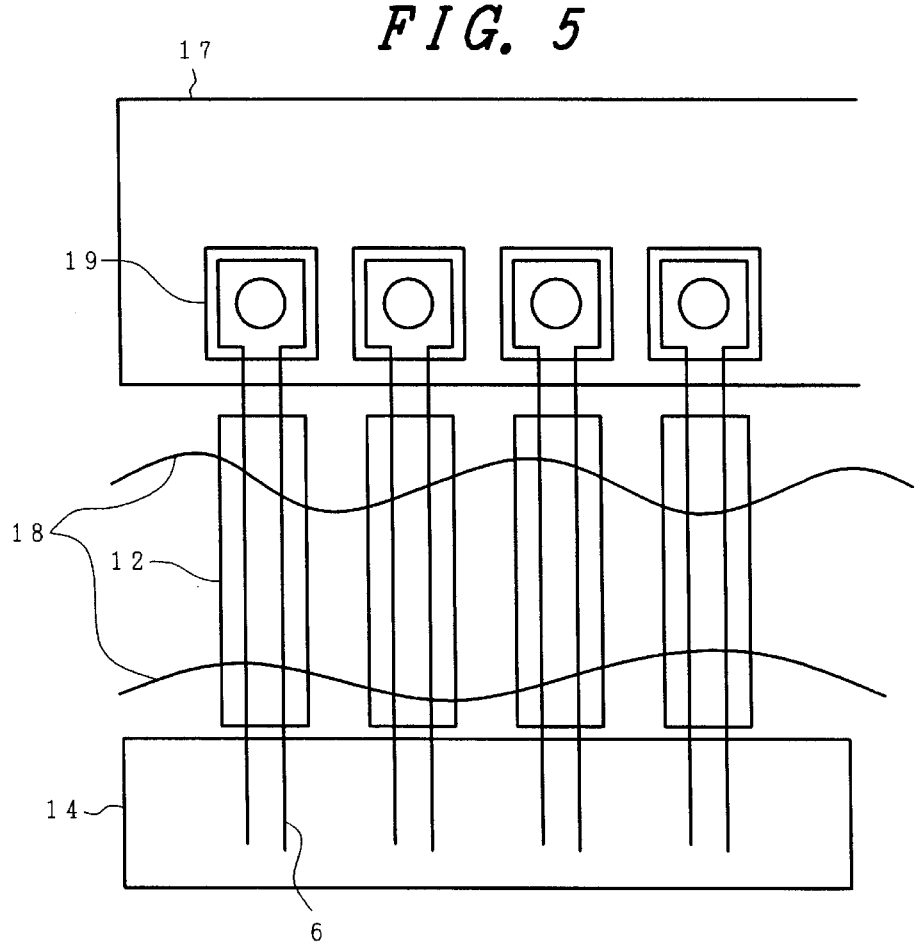
FIG. 5 is a plan view of the portion shown in FIG. 4.

FIG. 5 is a plan view showing the terminal portion shown in FIG. 4. The capping layer 12 is formed over each of the drain lines 6. In particular, it is necessary that the capping layers 12 underlie the boundaries of sealing portions made of the epoxy resin 18.

As shown in FIG. 4, a liquid crystal layer is interposed between the active matrix substrate 1 and the color filter substrate 14, and is sealed along its periphery by the sealing material 16. The driver chip 17 is disposed in the periphery of the active matrix substrate 1, and is connected to a terminal line which is led from the pixel area inside the sealing material 16, via the bump 20 and the conductor layer 19.

When the liquid crystal panel is assembled by sealing the interposed liquid crystal layer with the sealing material 16, its display area including the intersections of the gate lines and the drain lines is isolated from the outside, whereby atmospheric moisture is prevented from penetrating electrode lines. However, a portion in which the driver chip and the lead terminal are mounted which is led from the periphery of the liquid crystal panel is exposed to the outside air, so that there is a possibility that moisture penetrates a line conductor in this portion.

The liquid crystal panel is covered with the epoxy resin 18 on its sealing-material side and on the side on which the driver chip 17 is disposed, whereby the pixel area and the driver chip are isolated from external impact and moisture contained in the air. However, there are cases in which, during the curing of the epoxy resin 18, a stress is applied to the passivation layer 8 underlying the epoxy resin 18 and a crack or a pinhole occurs in a marginal portion of the epoxy resin 18.

In this construction example, the capping layer 12 made of an ITO layer is formed on the passivation layer 8 which covers the drain line 6 which constitutes a lead line. The capping layer 12 reduces the stress applied to the passivation layer 8 due to the shrinkage of the epoxy resin 18 during curing, thereby preventing a crack or a pinhole from occurring in the passivation layer 8. Even if the capping layer 12 is destroyed by a stress due to the curing of the epoxy resin 18, there is no problem because the ITO layer which constitutes the capping layer 12 does not play an electrical role.

The resin of the sealing material 16 may be of a thermosetting or photosetting type, and has an effect on a stress which occurs due to shrinkage during curing.

Moreover, as in the case of the intersections of the gate lines and the drain lines, since a minute crack which is originally present in the passivation layer 8 is covered with the capping layer 12, penetration of moisture through the minute crack can be prevented.

Figure 6:
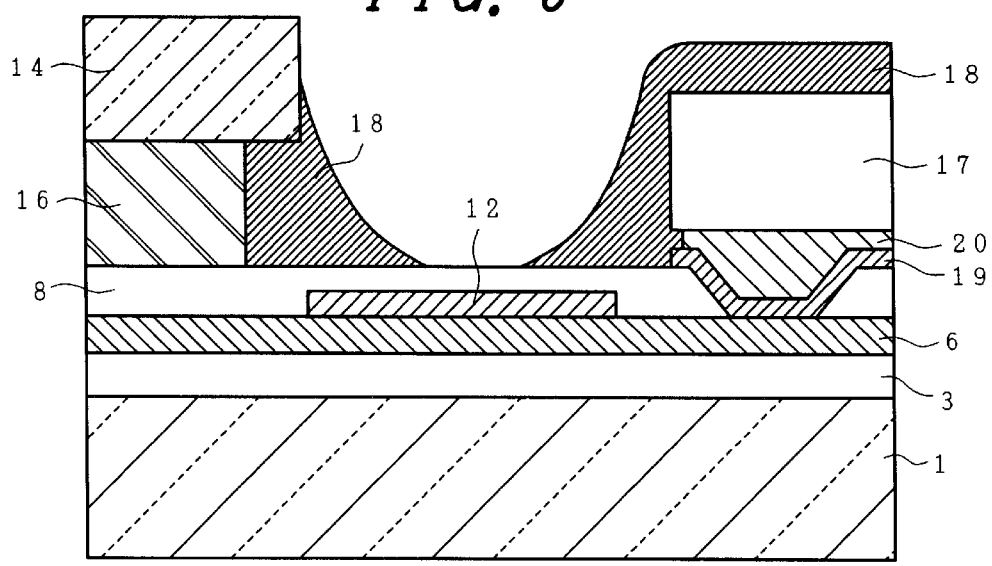
FIG. 6 is a partial enlarged cross-sectional view corresponding to FIG. 4, illustrating the essential portion of another example of the construction of the outside portion of the pixel area of the liquid crystal panel.

FIG. 6 is a partial enlarged cross-sectional view corresponding to FIG. 4, illustrating another example of the construction of the outside portion of the pixel area of the liquid crystal panel. In this construction example, the capping layer 12 made of an ITO layer is formed below the passivation layer 8 which covers the drain line 6 which constitutes a lead line. Owing to the capping layer 12, even if a crack or a pinhole occurs in the passivation layer 8 due to the shrinkage of the epoxy resin 18 during curing, the underlying lead line (drain line) 6 is shut off from the outside air, whereby the occurrence of electrolytic corrosion due to moisture in the air is avoided. There is no problem because the ITO layer which constitutes the capping layer 12 does not play an electrical role, either.

Moreover, as in the case of the intersections of the gate lines and the drain lines, even if a minute crack is originally present in the passivation layer 8, the capping layer 12 covers the underlying conductor layer so that penetration of moisture can be prevented.

As the thickness of the ITO layer which constitutes the capping layer is made larger, the effect of the ITO layer becomes larger. Since the etching speed of ITO is comparatively slow, it is impossible to make the ITO layer very thick, and it is, therefore, realistic to make the ITO layer approximately 50 nm to 200 nm thick. Preferably, the ITO layer is approximately 60 nm to 140 nm thick, and if the thickness of the ITO layer is in the preferable range, far better coverage of the underlying layer can be realized and the time required for etching can be made reasonable.

In this manner, it is possible to restrain electrolytic corrosion and prevent occurrence of a defective image by capping with the ITO layer the portion of the active matrix substrate in which a pinhole easily occurs. The cause why a pinhole occurs in the pixel area is that the passivation layer is holed by the growth of a hillock from a drain line after the formation of the passivation layer. When slight quantities of metal ions which are contaminant elements melt into the liquid crystal from a line through the pinhole, the electric conductivity of the liquid crystal layer is locally lowered, resulting in a defective image quality.

ITO which constitutes the capping layer protects the passivation layer against such hillock, and functions as a stopper for the liquid crystal layer even if metal ions which are contaminant elements melt out, whereby a good image quality can be maintained even in the case of long-term use.

One example of a method of manufacturing the liquid crystal panel having the capping layer will be described below in connection with the embodiment described above with reference to FIGS. 1, 2 and 4

A layer of a metal such as chromium (Cr) or molybdenum (Mo) is deposited to a thickness of about 200 mm by sputtering on the lower insulating substrate 1 which constitutes an active matrix substrate. A resist pattern is printed on the metal layer by photolithography, and the gate lines 2 are worked by wet etching using an aqueous solution of ceric ammonium nitrate.

By using a CVD process, the SiN layer 3 which is a gate insulating layer and the a-Si layer 4 which is a semiconductor layer are deposited, and an $n^+$ a-Si layer is deposited as a contact layer. The semiconductor layer and the contact layer are worked by photoetching, and the semiconductor pattern 4 is formed.

A layer of chromium (Cr) and molybdenum (Mo) is deposited as source and drain electrodes by sputtering, The source lines (source electrodes) 7 and the drain lines (drain electrodes) 6 are formed by photoetching similarly to the gate lines.

The $n^+$ a-Si layer of the contact layer 5 is etched away by using the source lines 7 and the drain lines 6 as a mask.

A SiN layer of thickness about 300 nm is deposited as the passivation layer 8 by a CVD process. The terminal portions of the gate and drain lines and the through-holes 9 in the source electrodes of the respective pixel portions are formed by photoetching. An indium-tin-oxide (ITO) layer is deposited to a thickness of about 140 nm as a transparent conductive layer by sputtering. Each of the pixel electrodes 10 is formed in such a manner that its edge portions coincide with the light shield layers 11 formed of the same layer as the gate lines, and an ITO pattern is also formed in a peripheral terminal portion. At this time, the capping layers 12 are formed over the passivation layers 8 at the intersections of the gate lines 2 and the drain lines 6 as well as in the peripheral portion of the substrate 1 which is coated with an epoxy resin as a portion which does not directly contact the lower electrode, so that all the portions of the drain lines 6 that pass over the gate lines 2 are covered with the capping layers 12.

The ITO layer which constitutes each of the capping layers 12 is placed in a floating state, and therefore does not perform an electrical action. As described previously, since the intersections of the gate lines and the drain lines are very uneven, pinholes due to insufficient coverage of the passivation layers easily occur. Particularly in an inspection step after the active matrix substrate is finished, when a short-circuit inspection of the gate lines and the drain lines is carried out while a direct current is being applied, the extent of electrolytic corrosion tends to become serious. However, since the capping layers according to the invention cover pinholes and the like produced in the passivation layers, the penetration of moisture which causes electrolytic corrosion is prevented.

In case that each gate line is formed as a pair of lines over an active matrix substrate, an ITO pattern is arranged to pass over all the four portions that pass over the gate lines 2. It is to be noted that, at this time, it is necessary to ensure a sufficient distance between adjacent pixel electrodes while widening a pixel area which determines an aperture ratio, so that two or more pixel electrodes are prevented from short-circuiting to cause a connection defect.

The above description has referred to one example of a method of manufacturing a capping layer in the liquid crystal panel having the construction described above in connection with the embodiment shown in FIGS. 1, 2 and 4. However, in case the invention is applied to a liquid crystal panel having the construction described above in connection with the embodiment shown in FIGS. 3 and 6, an ITO layer which constitutes a capping layer is deposited before the deposition of a passivation layer.

It is to be noted that although the above description of each of the embodiments has referred to the case in which the invention is applied to a so-called TN type of liquid crystal display device, the invention can be similarly applied to an IPS type of liquid crystal display device in which each drain electrode and its counter electrode (also called a common electrode) are formed in a comb-teeth-like shape over an active matrix substrate.

In the case of the IPS type of liquid crystal display device, it is also possible to form capping layers at locations similar to those in the TN type, but since no ITO layers are formed in pixel portions, by forming capping layers over all the gate and drain lines and comb-teeth-shaped electrode portions including gate-drain intersections, it is possible to completely restrain the melting-out of metal ions and prevent the occurrence of defective image quality independently of the aperture ratio.

Figure 7:
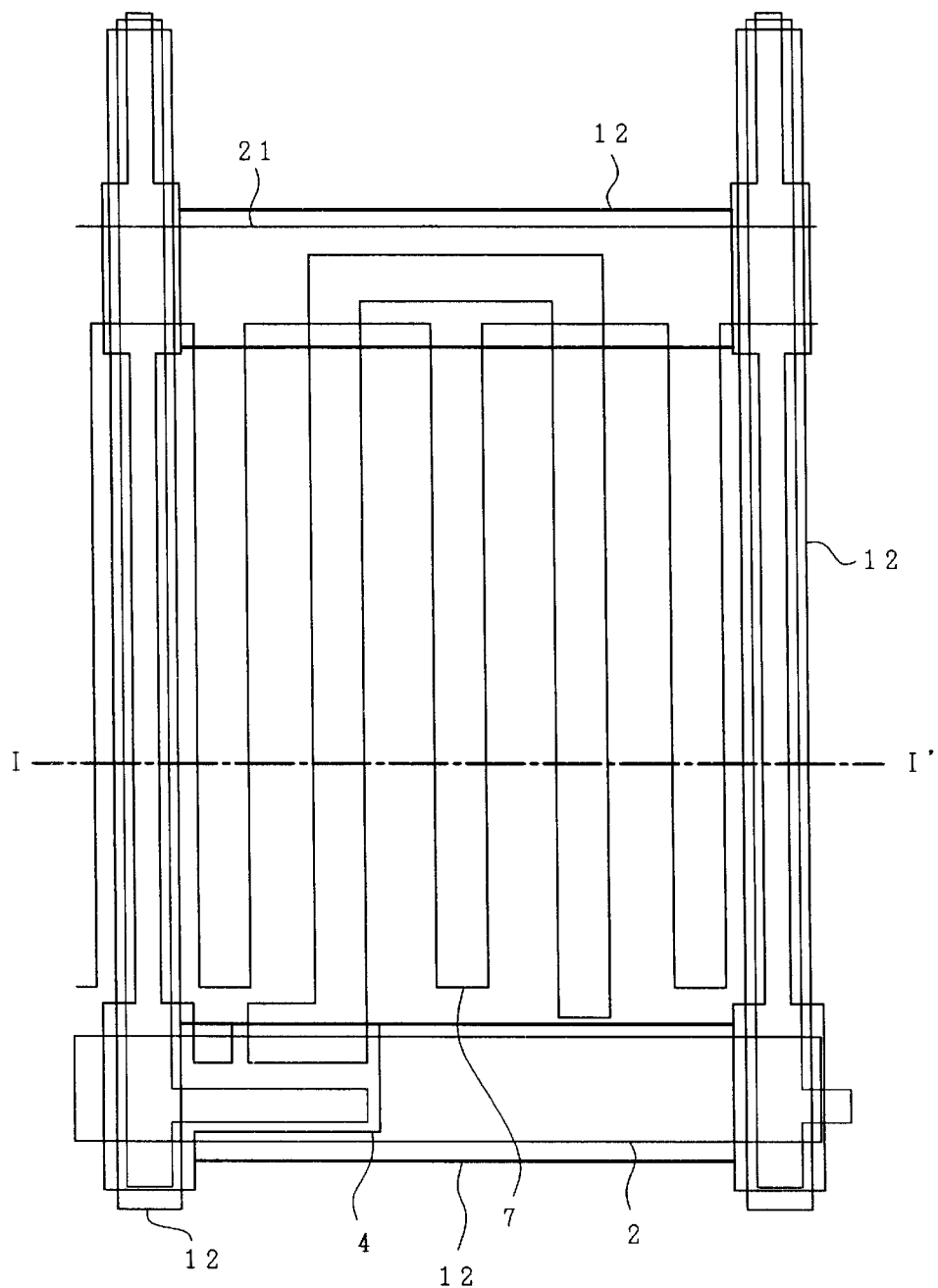
FIG. 7 is a plan view of a pixel area, illustrating one example of a lateral electric field type of liquid crystal display device according to the invention using thin-film transistors as switching elements.

FIG. 7 shows an example in which the invention is applied to the TFT substrate of a lateral electric field type of liquid crystal display device. An electric field for controlling the orientation of a liquid crystal is applied between a common electrode 21 and the source electrode 7, and a pixel electrode such as that shown in FIG. 1 is absent. In this case, a capping layer can be widely formed because there is no risk that the capping layer short-circuits to a pixel electrode. In the embodiment shown in FIG. 7, the capping layer 12 is formed over the drain lines 6, the gate lines 2 and the drain lines 6.

Figure 8:
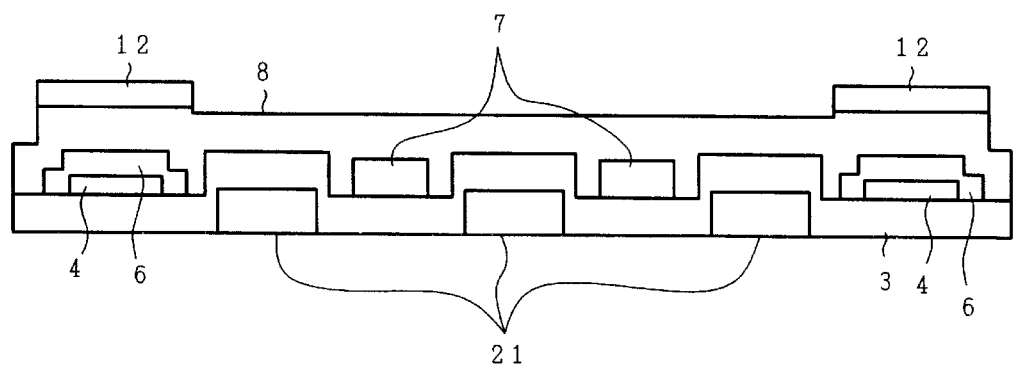
FIG. 8 is a plan view of a pixel area, illustrating another example of the lateral electric field type of liquid crystal display device.

FIG. 8 is a cross-sectional view taken along line I–I' of FIG. 7. No layer other than the capping layer 12 lies over the passivation layer 8, and therefore, the capping layer 12 made from a transparent conductive layer can be formed over the drain lines 6, the gate lines 2 and the common lines 21, none of which affects an image.

Figure 9:
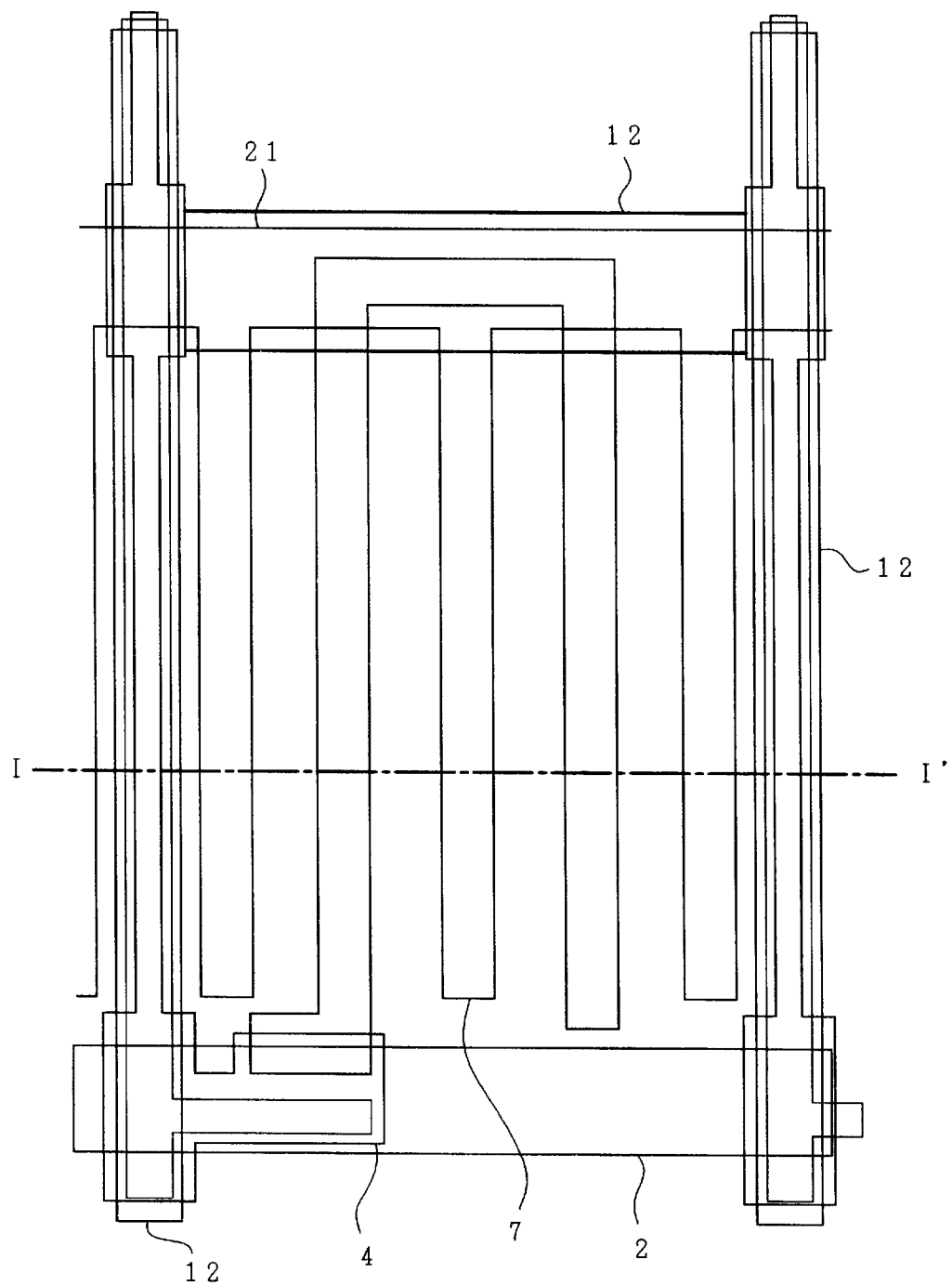
FIG. 9 is a plan view of a pixel area, illustrating another example of the lateral electric field type of liquid crystal display device.

FIG. 9 is a plan view showing a case in which the capping layer 12 does not lie over the gate line 2. A thin-film transistor (TFT) is formed on the gate line 2, and in case there is a risk that a variation in its TFT characteristics is caused by a variation in capacitance due to the formation of a conductive thin layer on the passivation layer 8, the capping layer 12 is not formed over the gate line 2.

Figure 10:
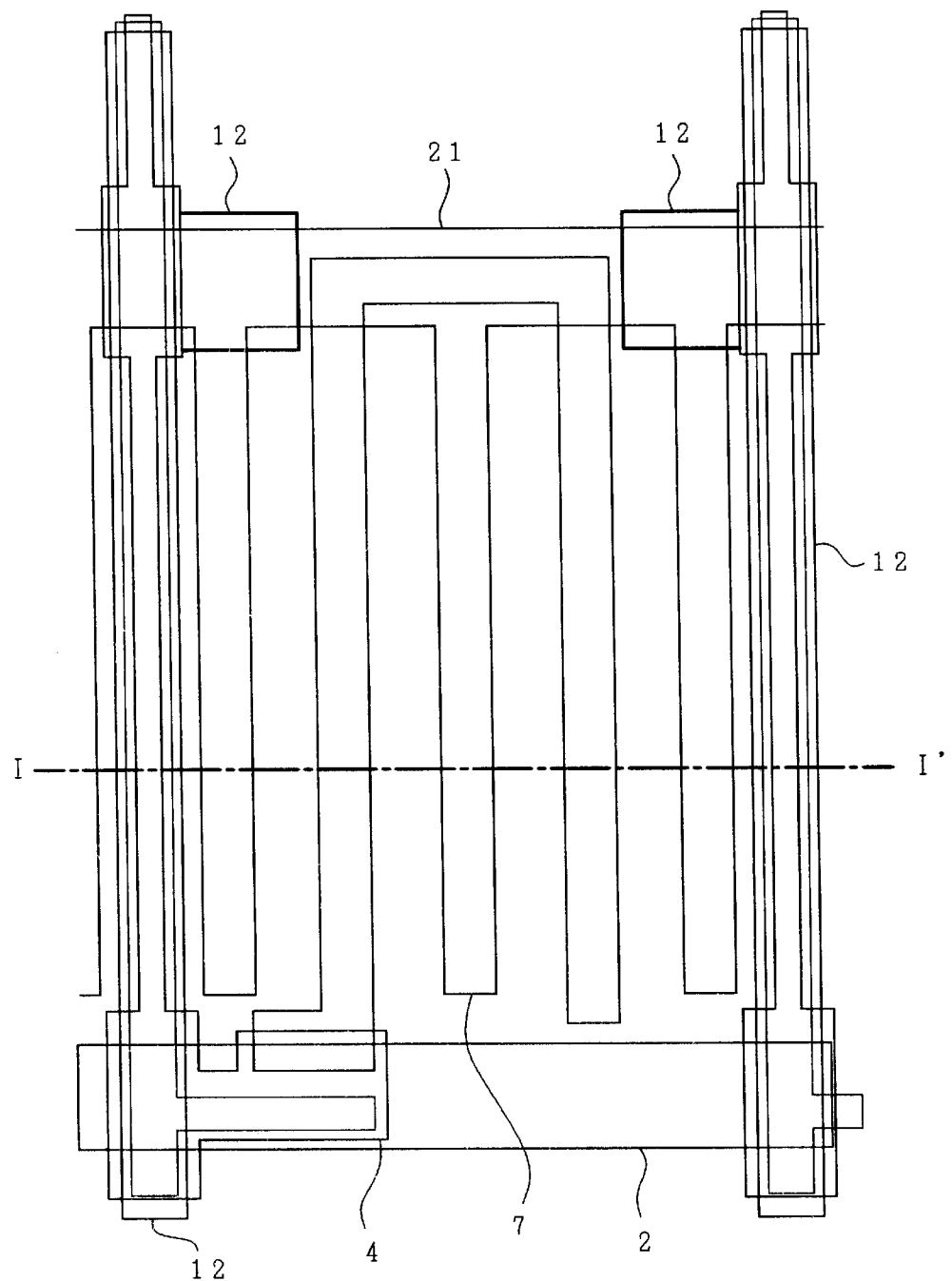
FIG. 10 is a plan view of a pixel area, illustrating another example of the lateral electric field type of liquid crystal display device.

FIG. 10 is a plan view showing an example in which the capping layer 12 is not formed over a storage capacitance which is formed on the common line 21 by the common line 21 and the source line 7 as well as the gate insulating layer 3 therebetween. In order to prevent a preset storage capacitance from varying when a transparent conductive layer is formed on the storage capacitance, a capping layer may also be formed over a portion other than the storage capacitance.

As described above, the invention can be applied to either of the vertical and lateral electric field types of liquid crystal display devices. Particularly in the case of the lateral electric field type, it is possible to greatly decrease the influence of a defect in a passivation layer by forming a capping layer over all lines.

The invention is not limited to the above-described prevention of electrolytic corrosion of drain lines, and, for similar purposes, can be applied to other metal lines or electrodes over which a capping layer similar to the above-described one can be formed.

Figure 11:
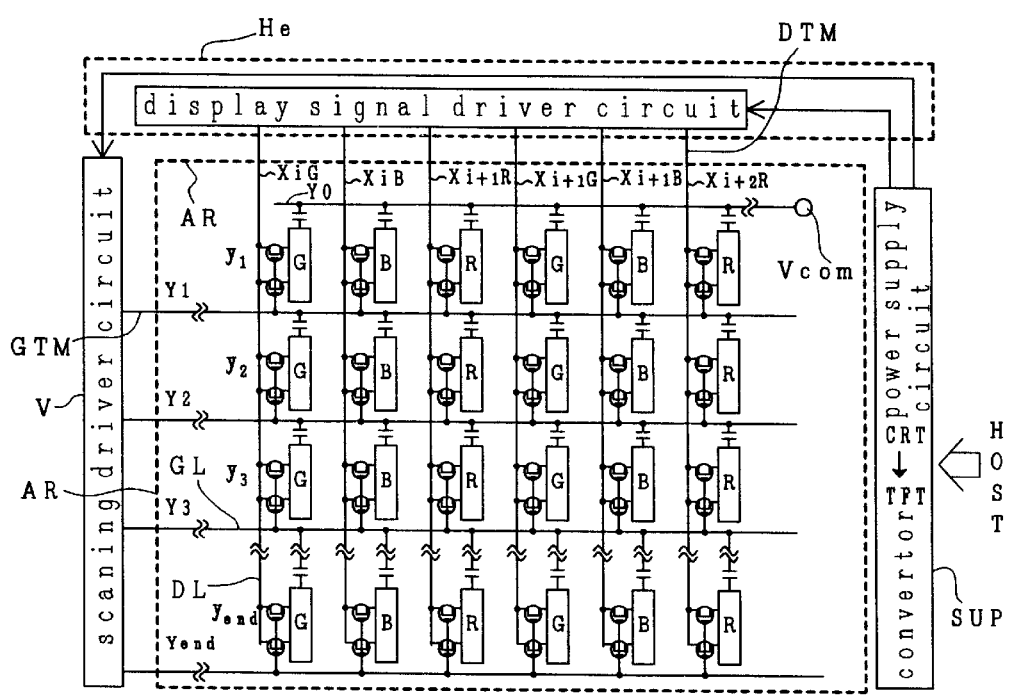
FIG. 11 is a circuit diagram showing the equivalent circuit and the peripheral circuitry of the pixel area of a liquid crystal panel which includes driving circuitry for a liquid crystal display device according to the invention.

FIG. 11 is a connection diagram showing the equivalent circuit and the peripheral circuitry of the pixel area of a liquid crystal panel which includes driving circuitry for a liquid crystal display device according to the invention. FIG. 11 is a circuit diagram which is drawn to correspond to an actual geometric arrangement. Symbol AR denotes a pixel area (matrix array) in which a plurality of pixels are arrayed two-dimensionally.

In FIG. 11, symbol X means a video signal line DL (the drain line 6 in each of the above-described embodiments), and affixes G, B and R are added to the symbol X to correspond to green, blue and red pixels, respectively. Symbol Y means a scanning signal line GL (the gate line 2 in each of the embodiments), and affixes 1, 2, 3, . . . , end are added to the symbol Y in accordance with the sequence of scanning timing.

The video signal lines X (whose affixes are omitted) are connected to a video signal driving circuit He which is shown on the top side of FIG. 11. Similarly to the lead terminals of the scanning signal lines Y, the lead terminals of the respective video signal lines X are disposed on only one side of the pixel area AR of the liquid crystal panel. Scanning signal lines Y (whose affixes are omitted) are connected to a vertical scanning circuit V.

Symbol SUP denotes a circuit which includes a power supply circuit for obtaining a plurality of divided stabilized voltage sources from one voltage source, and a circuit for exchanging information for a CRT (cathode-ray tube) received from a host (a host processor) into information for a TFT liquid crystal display device.

Figure 12:
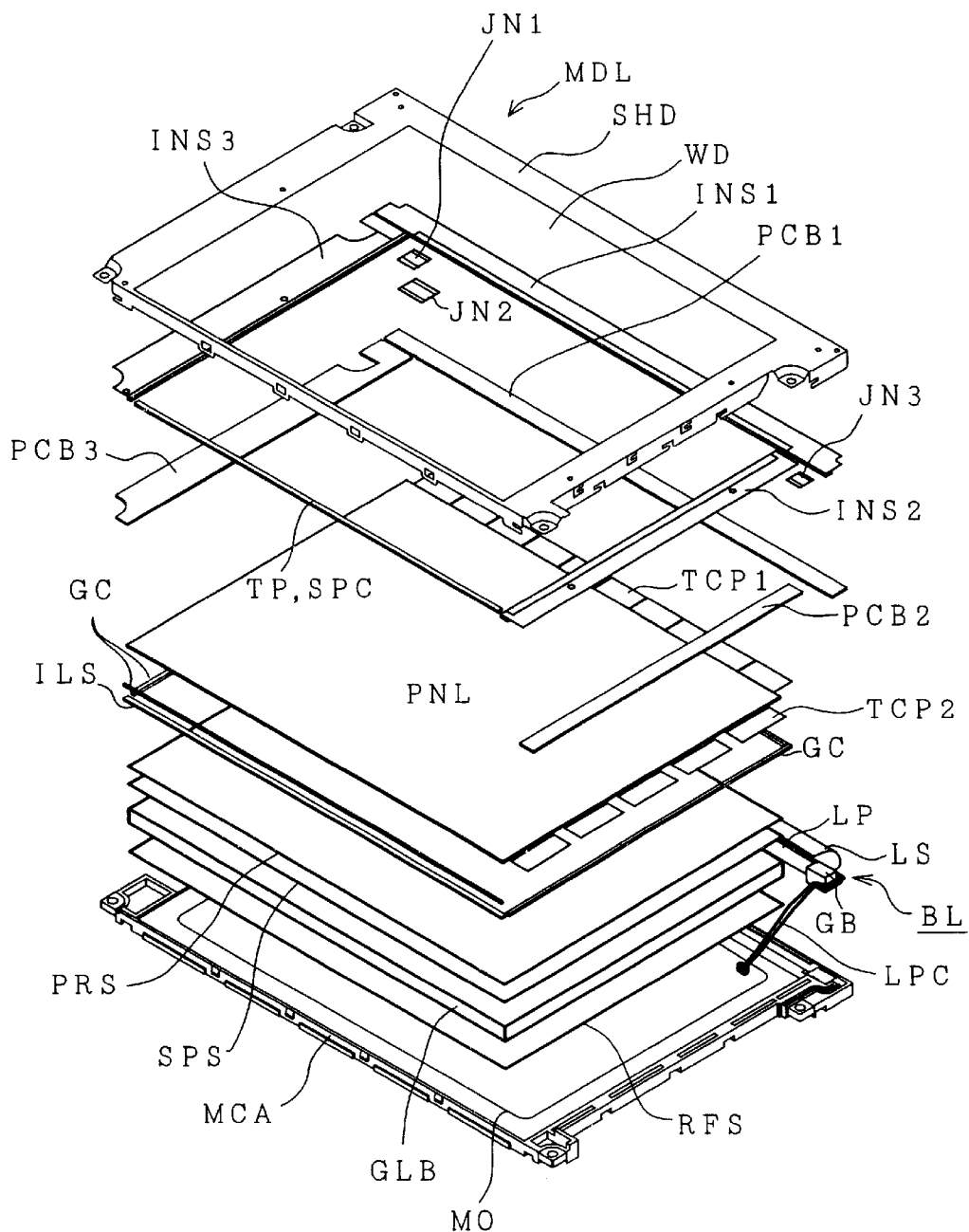
FIG. 12 is a developed perspective view illustrating one example of the entire construction of the liquid crystal display device according to the invention.

FIG. 12 is a developed perspective view illustrating one example of the entire construction of a liquid crystal display device according to the invention, and shows a back light type of liquid crystal display device in which an illuminating light source is disposed at the back of a liquid crystal panel.

The shown liquid crystal display device is intended to illustrate a specific structure of a liquid crystal display device (or module; referred to as MDL) in which a liquid crystal panel, a circuit board, a back light and other constituent members are integrated.

In FIG. 12, symbol SHD denotes an upper frame (also called a shield case or a metal frame) made from a metal plate, symbol LCW; symbol WD a display window; symbols INS1 to INS3 insulating sheets; symbols PCB1 to PCB3 circuit boards (PCB1: a drain side circuit board which is a video signal line driving circuit board; PCB2 a gate side circuit board; and PCB3 an interface circuit board); symbols JN1 to JN3 joiners for electrically connecting the circuit boards PCB1 to PCB3; symbols TCP1 and TCP2 tape carrier packages; symbol PNL a liquid crystal panel having a structure according to any of the above-described embodiments; symbol POL an upper polarizer; symbol GC a rubber cushion; symbol ILS a light shield spacer; symbol PRS a prism sheet; symbol SPS a diffusing sheet; symbol GLB a light guide plate; symbol RFS a reflecting sheet; symbol MCA a lower case (a lower-side frame or mold frame) formed by integral molding; symbol MO an aperture of the lower case MCA; and symbol BAT a double-faced adhesive tape; symbol GB a rubber bushing for supporting the fluorescent lamp LP. The diffusing sheet members are stacked in the shown arrangement to assemble the liquid crystal display module MDL. A light source assembly made of a fluorescent tube LP and a reflecting sheet LS is disposed along one side of the light guide plate GLB, and a lamp cable LPC is led from the rubber cushion GC disposed at one end of the fluorescent tube LP. Electricity is supplied from a back light power supply (not shown) to the fluorescent tube LP via the lamp cable LPC. A back light BL is constructed of the light guide plate. GLB and the light source assembly. Incidentally, light source assemblies may also be disposed along two or four sides of the light guide plate GLB.

The liquid crystal display device (the liquid crystal display module MDL) has a case made of two kinds of accommodating/holding members, the lower frame MCA and the upper frame SHD, and is constructed by joining the lower case MCA to the upper frame SHD. The insulating sheets INS1 to INS3, the circuit boards PCB1 to PCB3 and the liquid crystal display panel PNL are fixedly accommodated in the lower case MCA, and the back light BL made of the light guide plate GLB and the like is also accommodated in the lower case MCA.

An electronic component such as an integrated circuit chip for driving the individual pixels of the liquid crystal panel PNL is mounted on the circuit board PCB1 for driving the video signal lines, whereas electronic components are mounted on the interface circuit board PCB3, such as an integrated circuit chip for receiving video signals from an external host computer and control signals such as timing signals, a timing converter (TCON) for generating clock signals by processing timing, low-voltage differential signal chips, capacitors and resistors.

The clock signals generated by the timing converter are supplied to the integrated circuit chip which is mounted on the video signal line driving circuit board PCB1.

The interface circuit board PCB3 and the video signal line driving circuit board PCB1 are multi-layered wiring boards, and clock signal lines CLL are formed as inner-layer lines of the interface circuit board PCB3 and the video signal line driving circuit board PCB1.

The drain side circuit board PCB1 for driving TFTs, the gate side circuit board PCB2 and the interface circuit board PCB3 are connected to the liquid crystal panel PNL by the tape carrier packages TCP1 and TCP2. The individual circuit boards are interconnected by the joiners JN1, JN2 and JN3.

Figure 13:
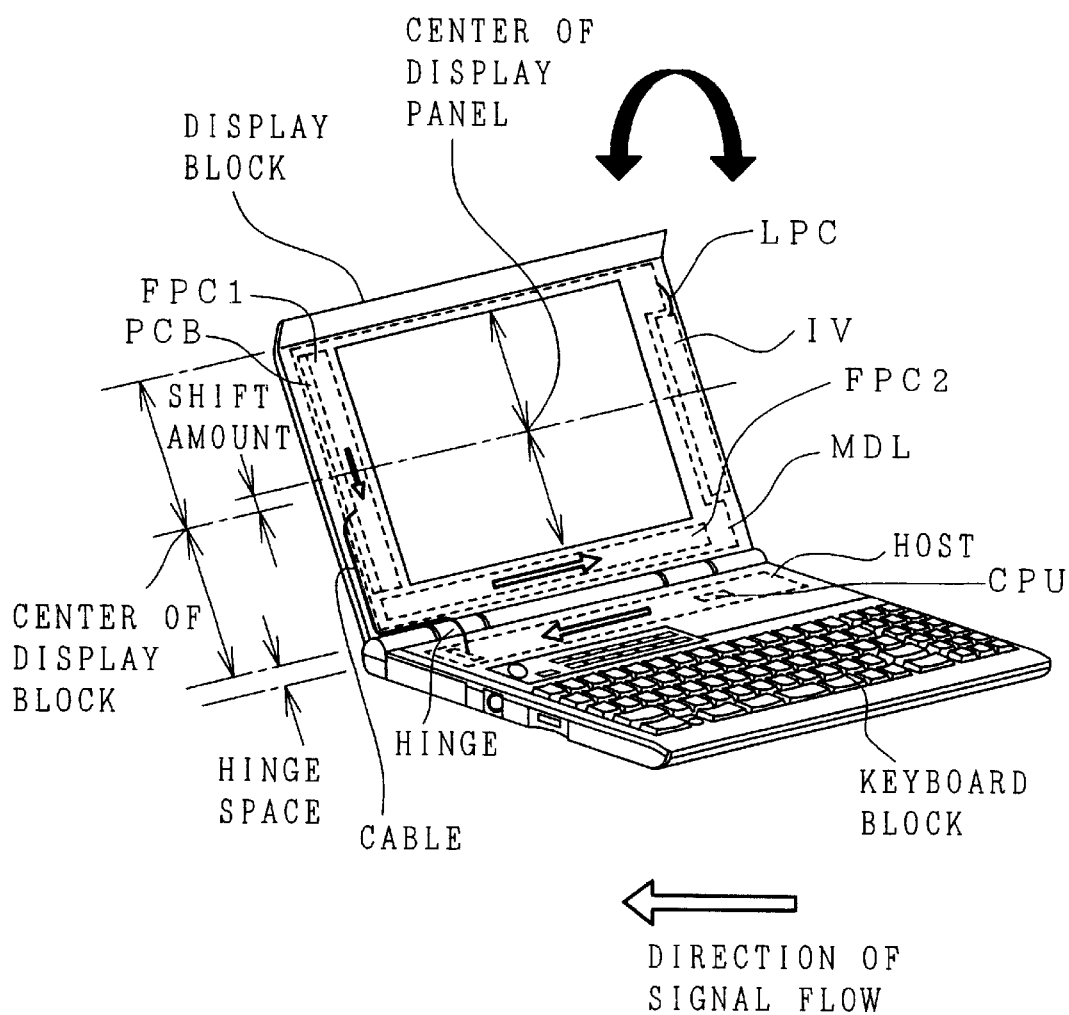
FIG. 13 is a view of the external appearance of a notebook personal computer which is one example of an electronic apparatus in which the liquid crystal display device according to the invention is mounted.

FIG. 13 is a view of the external appearance of a notebook personal computer which is one example of an electronic apparatus in which a liquid crystal display device according to the invention is mounted.

In this notebook personal computer, a keyboard block and a display block are joined together by a hinge, and a host computer including a CPU is included in the keyboard block, and the liquid crystal display device according to the invention is mounted in the display block as a liquid crystal display module (MDL).

The driving circuit boards PCB1, PCB2 and PCB3 and an inverter power supply IV for backlighting are mounted on the periphery of the liquid crystal panel PNL which constitutes the liquid crystal display module. In FIG. 13, symbol CT denotes a connector for connection to the host, and symbol TCON denotes a control circuit for generating signal processing, timing signals and the like for displaying an image on the liquid crystal panel PNL on the basis of a display signal inputted from the host.

Figure 14:
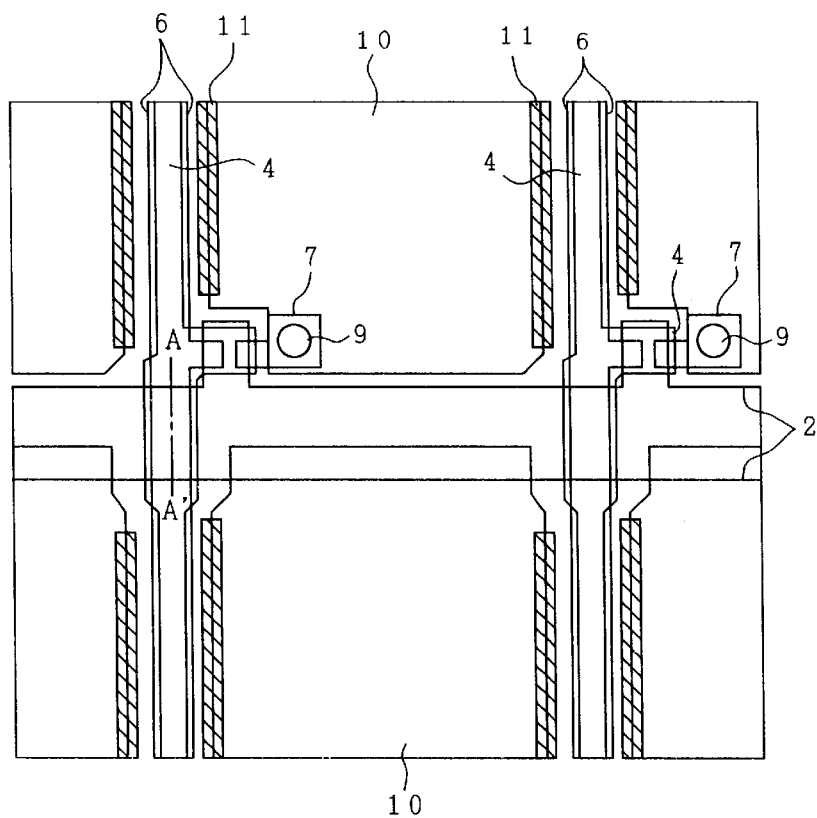
FIG. 14 is a plan view illustrating showing the essential portion of one example of the construction of an intersection of a gate line and a drain line in a pixel area of a related-art liquid crystal display device which uses thin-film transistors as switching elements.
Figure 15:
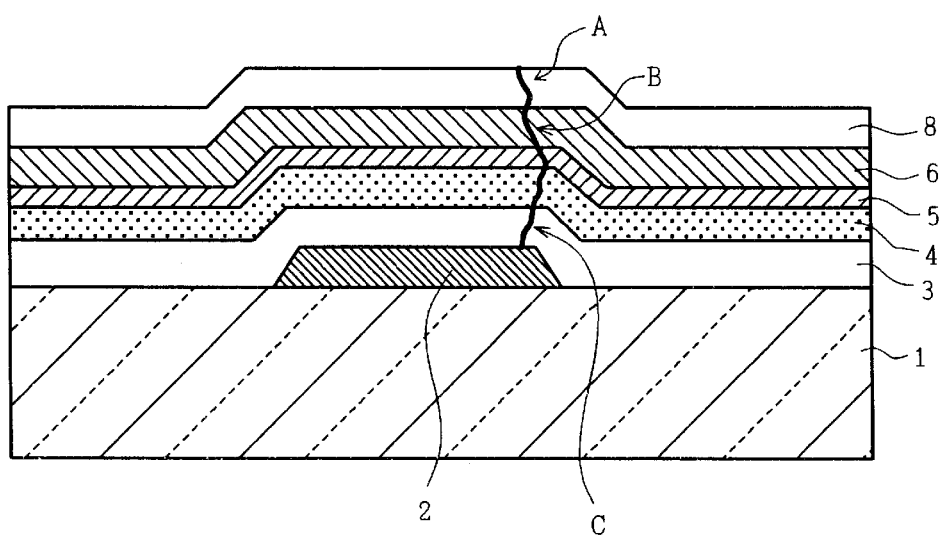
FIG. 15 is a cross-sectional view taken along line A–A' of FIG. 10.
Figure 16:
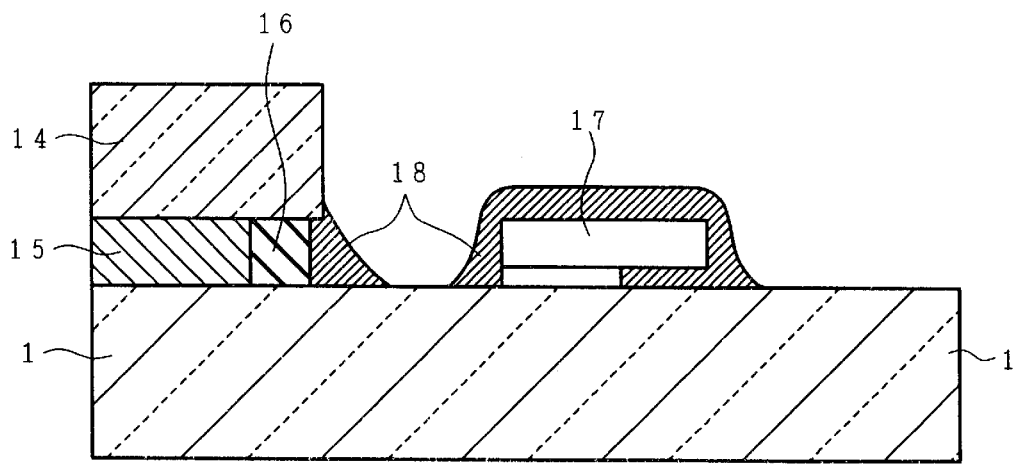
FIG. 16 is a diagrammatic cross-sectional view illustrating one example of the construction of an outside portion of the pixel area of the liquid crystal panel.

Needless to say, the liquid crystal display device according to the invention can be used in not only a portable personal computer such as the notebook type shown in FIG. 14, but also various other display devices such as desktop type monitors for desktop personal computers.

As is apparent from the foregoing description, in accordance with the invention, it is possible to prevent drain disconnection from being caused by electrolytic corrosion due to static electricity and moisture which penetrates through pinholes which may be formed in a passivation layer owing to various treatments in the process of manufacturing an active matrix substrate for a liquid crystal panel which constitutes a liquid crystal display device. In addition, it is possible to prevent drain disconnection from being caused by electrolytic corrosion due to moisture which penetrates through pinholes which may be formed in a passivation layer during the application of electricity in the step of inspecting short circuits between gate lines and drain lines after an active matrix substrate is finished. In addition, it is possible to prevent the disconnections of line lead terminals from being caused by the penetration of moisture through pinholes which may be formed in a passivation layer owing to stresses due to the effect of an epoxy resin to be applied after the sticking and sealing of a color filter substrate and after the mounting of driver chips. Moreover, it is possible to prevent a defective display from being caused by a decrease in the electric conductivity of a liquid crystal layer due to the melting of metal ions into the liquid crystal layer from a metal line formed in a pixel area. Accordingly, it is possible to provide a liquid crystal display device having high reliability and high quality.

What is claimed is:

1. A liquid crystal display comprising:
a pair of substrates;
a liquid crystal layer interposed between said pair of substrates;
a plurality of gate lines formed on one of said substrates, which gate lines extend to form a gate pad;
a plurality of drain lines formed on said one of said substrates, which drain lines extend to form a drain pad;
an insulating layer covering said gate lines and said drain lines;
wherein an electrically conductive layer is formed on said gate lines adjacent to said gate pad, and a resin layer covers at least a portion of an edge of said electrically conductive layer, a sealing material formed between said pair of substrates, except for a liquid crystal filling space, said resin layer covering at least a portion of said sealing material.

2. A liquid crystal display comprising:
a pair of substrates;
a liquid crystal layer interposed between said pair of substrates;
a plurality of gate lines formed on one of said substrates and being extended to form agate pad;
a plurality of drain lines formed on one of said substrates and being extend to form a drain pad;
an insulating layer covering said gate lines and said drain lines;
wherein an electrically conductive layer is formed on said drain lines adjacent to said drain pad, and a resin layer covers at least a portion of an edge of said electrically conductive layer, and said resin covers at least a portion of one of said gate driver and said drain driver, said gate pad is connected to a gate driver, and said drain pad is connected to a drain driver.

3. A liquid crystal display comprising:
a pair of substrates;
a liquid crystal layer interposed between said pair of substrates;
a plurality of gate lines formed on one of said substrates and being extended to form a gate pad;
a plurality of drain lines formed on one of said substrates and being extended to form a drain pad;
an insulating layer covering said gate lines and said drain lines;
wherein an electrically conductive layer is formed on said drain lines adjacent to said drain pad, and a resin layer covers at least a portion of an edge of said electrically conductive layer; and
a sealing material formed between said pair of substrates, except for a liquid crystal filling space, said resin layer covering at least a portion of said sealing material.

4. A liquid crystal display comprising:
a pair of substrates;
a liquid crystal layer interposed between said pair of substrates;
a plurality of gate lines formed on one of said substrates, which gate lines extend to form a gate pad;
a plurality of drain lines formed on one of said substrates, which drain lines extend to form a drain pad;
an insulating layer covering said gate lines and said drain lines;
wherein an electrically conductive layer is formed on said gate lines adjacent to said gate pad, and a resin layer covers at least a portion of an edge of said electrically conductive layer, said gate pad is connected to a gate driver, and said drain pad is connected to a drain driver, said resin covers at least a portion of one of said gate driver and said drain driver.

5. A liquid crystal display comprising:
a pair of substrates;
a liquid crystal layer interposed between said pair of substrates;
a plurality of gate lines formed on one of said substrates, which gate lines extend to form a gate pad;
a plurality of drain lines formed on one of said substrates, which drain lines extend to form a drain pad;
an insulating layer covering said gate lines and said drain lines;
a plurality of pixel electrodes formed on one of said substrates;
wherein an electrically conductive layer is formed on said gate lines adjacent to said gate pad, and a resin layer covers at least a portion of an edge of said electrically conductive layer, said electrically conductive layer is a transparent film containing as a chief component any one of ITO, IZO and IGO.

6. A liquid crystal display comprising:
a pair of substrates;
a liquid crystal layer interposed between said pair of substrates;
a plurality of gate lines formed on one of said substrates and being extended to form a gate pad;
a plurality of drain lines formed on one of said substrates and being extend to form a drain pad;
an insulating layer covering said gate lines and said drain lines;

wherein an electrically conductive layer is formed on said drain lines adjacent to said drain pad, and a resin layer covers at least a portion of an edge of said electrically conductive layer, said electrically conductive layer is a transparent film containing as a chief component, any one of ITO, IZO and IGO.

7. A liquid crystal display according to any one of claims 1, 2, 3, 4, 5 and 6, wherein said electrically conductive layer is formed on said insulating layer.

8. A liquid crystal display according to any one of claims 1, 2, 3, 4, 5 and 6, wherein said electrically conductive layer is formed under said insulating layer.

9. A liquid crystal display according to any one of claims 1, 2, 3, 4, 5 and 6, wherein said resin layer is formed by an epoxy resin of the heat curing type.

10. A liquid crystal display according to any one of claims 1, 2, 3, 4, 5 and 6, wherein the width of said electrically conductive layer is wider than said gate line or said drain line.

11. A liquid crystal display comprising:
a pair of substrates;
a liquid crystal layer interposed between said pair of substrates;
a plurality of gate lines formed on one of said substrates;
a plurality of drain lines formed on one of said substrates;
a sealing material formed between said pair of substrates;
wherein at least an electrically conductive layer is formed on or over one of said gate lines and said drain lines, and a resin layer which is overlapped with both a pad side edge and a sealing material side edge of said electrically conductive layer at outside of said sealing material.

12. A liquid crystal display according to claim 11, wherein said resin layer covers at least a portion of said sealing material.

13. A liquid crystal display according to claim 12, wherein said resin layer covers at least a portion of a pad.

14. A liquid crystal display according to claim 11, wherein said resin layer covers at least a portion of a pad.

15. A liquid crystal display according to claim 11, wherein said resin layer covers at least a driver.

16. A liquid crystal display according to claim 12, wherein said resin layer covers at least a driver.

17. A liquid crystal display according to any one of claims 11 to 16, wherein said resin layer is directly attached to said electrically conductive layer.

18. A liquid crystal display according to any one of claims 11 to 16, wherein said electrically conductive layer is formed on one of said gate lines and said drain lines.

19. A liquid crystal display according to any one of claims 11 to 16, wherein a width of said electrically conductive layer is wider than a width if said gate line or a width said drain line.

20. A liquid crystal display according to any one of claims 11 to 16, wherein said electrically conductive layer is a transparent film containing as a chief component, any one of ITO, IZO and IGO.

21. A liquid crystal display according to any one of claims 11 to 16, wherein a space is formed between a portion of said resin layer formed at said pad side and a portion of said resin layer formed at said sealing material side.

22. A liquid crystal display comprising:
a pair of substrates;
a liquid crystal layer interposed between said pair of substrates;
a gate line formed on one of said pair of substrates;
a common line formed on said one of said pair of substrates;
a drain line formed on a first insulating layer;
a second insulating layer formed on said drain line;
a counter electrode formed on said one of said pair of substrates;
wherein an electrically conductive layer is formed over said drain lines and is elongated along said drain lines, and said electrically conductive layer has at least one projected portion extending over a portion of said common line; and
wherein said one projection portion over said common line is separated from an adjacent another one projected portion of said electrically conductive layer.

23. A liquid crystal display according to claim 22, wherein said projected portion over said common line is separated from a storage capacitance formed on a common line.

24. A liquid crystal display comprising:
a pair of substrates;
a liquid crystal layer interposed between said pair of substrates;
a gate line formed on one of said pair of substrates;
a storage line formed on said one of said pair of substrates;
a drain line formed on a first insulating layer;
a second insulating layer formed on said drain line;
wherein an electrically conductive layer is formed over said drain lines and is elongated along said drain lines, and said electrically conductive layer has at least one projected portion extending over a portion of said storage line; and
wherein said projected portion over said storage line is separated from an adjacent one said electrically conductive layer.

25. A liquid crystal display according to claim 24, wherein said projection portion over said storage line is separated from a storage capacitance formed on a common line.

26. A liquid crystal display according to any one of claims 22 and 23 to 25, wherein said electrically conductive layer is a transparent conductor.

27. A liquid crystal display according to any one of claims 22 and 23 to 25, wherein said electrically conductive layer is a transparent film containing as a chief component, any one of ITO, IZO and IGO.

* * * * *